United States Patent [19]
Akre

[11] Patent Number: 4,706,449
[45] Date of Patent: Nov. 17, 1987

[54] APPARATUS FOR ASSEMBLING OPTICAL FIBERS ONTO A SUPPORT FILAMENT

[75] Inventor: Collin A. Akre, Clavet, Canada

[73] Assignee: Northern Telecom Limited, Montreal, Canada

[21] Appl. No.: 933,414

[22] Filed: Nov. 21, 1986

[51] Int. Cl.$^4$ .................. G02B 6/10; G02B 6/16; H01B 13/02; D01H 13/04
[52] U.S. Cl. .................................... 57/6; 57/9; 57/13; 57/352; 350/96.23
[58] Field of Search ............... 57/6, 9, 13, 18, 352; 350/96.23

[56] References Cited

U.S. PATENT DOCUMENTS

| 4,154,049 | 5/1979 | King et al. | 57/9 |
|---|---|---|---|
| 4,195,468 | 4/1980 | King et al. | 57/9 |
| 4,205,899 | 6/1980 | King et al. | 350/96.23 |
| 4,309,866 | 1/1982 | Fombellida | 57/352 X |
| 4,384,446 | 5/1983 | Hope et al. | 57/6 |
| 4,483,134 | 11/1984 | McKay et al. | 57/9 X |
| 4,620,412 | 11/1986 | Portinari | 57/6 |
| 4,635,430 | 1/1987 | Missout et al. | 57/6 |

*Primary Examiner*—John Petrakes
*Attorney, Agent, or Firm*—R. J. Austin

[57] ABSTRACT

Apparatus for assembling optical fibers into sinuous grooves of a support filament in which an annular laying head for guiding the filament has guide bores for the fibers. The bores are fixed within the head and are angularly spaced around it and inclined relative to an axis passing through the head. Groove locating projections are provided, one projection associated with each guide bore. The projections entered into a central passage of the annular head, each projection axially to one side of and adjacent the outlet end of its associated guide bore. The projections located within the filament grooves thereby aligning the bore outlet ends to feed the optical fibers directly into the grooves.

5 Claims, 6 Drawing Figures

APPARATUS FOR ASSEMBLING OPTICAL FIBERS ONTO A SUPPORT FILAMENT

This invention relates to apparatus for assembling optical fibers onto a support filament.

Suggestions have been made in the manufacture of optical cable for locating optical waveguides in a grooved support filament. In U.S. Pat. No. 4,205,899 granted Jun. 3, 1980 to F. D. King and T. S. Swiecicki, there is described an optical cable with a grooved support or central filament in which the grooves are helical with alternately reversing twist, i.e. they change hand along the length of the filament. Hence the grooves are sinuous. Optical fibers are located in the grooves by passing the fibers through a reciprocal plate which surrounds the path of the support filament as it moves along a passline, the fibers extending along guide fingers or tubes which are located within the grooves of the support filament. As the filament passes through the reciprocal plate, the plate is caused to rotate by engagement of the fingers within the grooves, the location of the grooves dictating the reciprocating motion of the plate. A problem with the structure in practice is that the fingers have flexible ends for engaging the sinuous grooves and to enable them to follow the groove. Bearing of the fingers on the bases of the grooves has been found to flex them into a permanently curved shape in which the ends face outwardly of the grooves. With this situation, the fibers are not fed correctly into the bases of the grooves, but are directed outwardly of the grooves so that there is a tendency on occasion, for the fibers to emerge from the grooves. There is thus a possibility of these unprotected fibers becoming damaged.

In other U.S. Patents granted to F. D. King and T. S. Swiecicki, namely U.S. Pat. Nos. 4,154,049 and 4,195,468 granted May 15, 1979 and Apr. 1, 1980 respectively, the fibers are fed into the grooves of the support filaments in a similar manner to that described in U.S. Pat. No. 4,205,899 and thus the same problems could arise.

In an attempt to overcome the above problems, an improvement has been made in which the flexible fingers or tubes are replaced with rigid tubes which are freely mounted within a carrier to allow for lateral swinging motion of the tubes. This construction is described in U.S. Pat. No. 4,483,134, granted Nov. 20, 1984 and entitled "Laying Of Optical Waveguides Onto A Support Filament" in the names of G. McKay and R. J. Williams. While the construction described in the latter patent does in fact avoid the permanent bending found with the flexible tubes, the construction suffers from a disadvantage relating to the method of attachment of the tubes to the carrier. Because of their free swinging motion within the carrier, the rigid tubes tend to bounce in the grooves upon hitting a minor groove surface imperfection or upon change in direction of the grooves. This results in imperfect laying of the optical fibers within the grooves and the fibers may again project outside the grooves thereby endangering them upon subsequent procedural steps. In addition to this, the constant swinging action of the tubes subjects them to extreme loading conditions. As a result, tube breakage does occur thereby stopping production.

The present invention provides an apparatus for laying optical fibers into grooves of a support filament which either avoids or reduces the above problems. The inventive apparatus distinguishes itself from prior constructions in that it has an annular laying head formed with a plurality of guide bores angularly spaced around a passline for the support filament and groove locating projections are provided in the head which extend into a passage for the support filament, each projection lying immediately adjacent and axially to one side of an associated guide bore. In this structure, the projections hold the laying head in a fixed position relative to the sinuous grooves of the support filament so that outlet ends of the guide bores are aligned correctly with the sinuous grooves to lay the optical fibers into them. This structure thus avoids the use of the guide tubes which are either freely floating or are flexible according to the prior art. Hence any damage to such guide tubes is avoided.

In other words, the present invention provides an apparatus for assembling optical fibers into sinuous grooves extending along the outer surface of a support filament comprising an annular laying head surrounding an axially extending passage for accommodating the support filament as it moves along a passline through the passage, the laying head formed with a plurality of guide bores for optical fibers, said bores fixed in position within the head, and angularly spaced apart around and inclined relative to the passline with each bore having an inlet end disposed radially outwardly from an outlet end which lies at the surface of the axially extending passage and at the downstream end of the bore with respect to the direction of movement of the filament along the passline, the head also having a plurality of groove locating projections associated with some at least of the guide bores, one bore to each projection, the projections extending into the passage each in a position axially to one side of and immediately adjacent the outlet end of its associated guide bore.

In the apparatus according to the invention, the laying head may comprise a metal block with the guide bores formed into the block. Alternatively the laying head may comprise a metal block having insert tubes held within the block, the tubes defining the guide bores.

It is an important feature of the invention that the guide bores are held rigidly in position with respect to the laying head and also with regard to the groove locating projections.

While the groove locating projections may lie axially to either side of the outlet ends of the guide bores, in a preferred arrangement the projections lie axially upstream of the outlet ends.

In a preferred arrangement, the laying head has a downstream end with an annular surface which converges towards the passline in the downstream direction. This convergence may be provided by an annular surface of frusto-conical shape. In this arrangement the apparatus also comprises a means for guiding a binder around the support filament from a binder supply station downstream from the laying head, the guiding means operable to guide binder around the annular surface whereby the binder will slide along the surface towards the passline.

Embodiments of the invention will now be described, by way of example, with reference to the accompanying drawings, in which.

Figure 1:
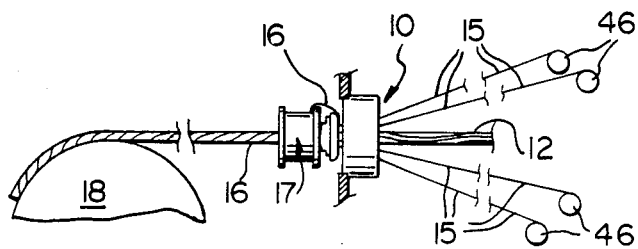
FIG. 1 is a side elevational view showing diagrammatically an apparatus according to a first embodiment for assembling optical fibers into grooves of a support filament.

An apparatus 10 for assembling optical fibers into sinuous grooves of a support filament 12 is shown generally in FIG. 1. As can be seen particularly from FIG. 4, the support filament 12 has a plurality, namely six, grooves 14 which extend along it in side-by-side and parallel relationship. Eight grooves 14 are also normally used. These grooves extend helically, alternately in one direction and then in the other, so as to be in the form of sinuations which extend around the longitudinal axis of the support filament for any desired angle. In this particular case, that angle is approximately 320° to 340° around the axis of the support filament. As the filament passes through the apparatus, optical fibers 15 are laid firmly into the grooves (FIG. 3) and the support filament is then wrapped with a binder tape 16 (FIGS. 1 and 5) supplied by a spool 17 before the filament continues along its passline to be reeled onto a reel 18 as shown in FIG. 1. One or more fibers 15 may be laid in each groove.

Figure 2:
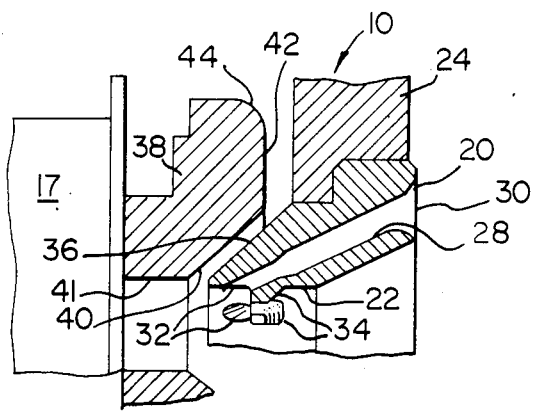
FIG. 2 is a cross-sectional view, on a larger scale than FIG. 1, showing the apparatus in more detail and in the same direction as in FIG. 1.
Figure 3:
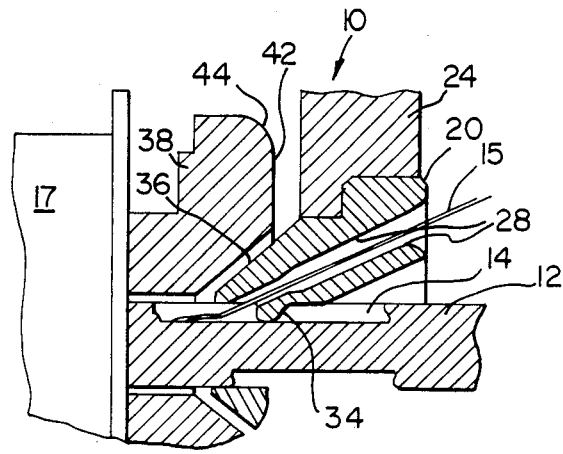
FIG. 3 is a cross-sectional view of part of the apparatus and in the same direction as FIG. 2 and with a support filament passing through it.
Figure 4:
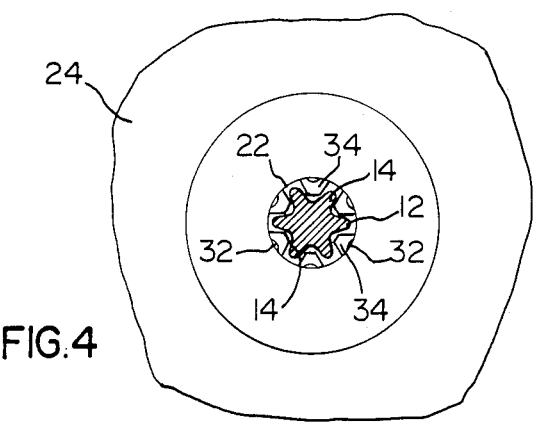
FIG. 4 is a cross-sectional view of the apparatus taken along line IV-IV in FIG. 3 and with parts of the apparatus omitted for clarity.

As is more clearly shown in FIGS. 2, 3 and 4, the apparatus comprises an annular laying head 20 defining an axially extending passage 22 for accommodating the support filament as it moves along its passline through the passage. The laying head 20 is received within an annular mounting 24 which is rotatable within a fixed frame (not shown) so as to allow the head to rotate together with the angular movement of the sinuous grooves around the axis of the filament to enable the fibers to be laid correctly within the grooves as will be described. Alternatively, the mounting is fixed in the frame to hold the head stationary. In the latter case, it is necessary when laying fibers into the grooves to control the filament so as to retain each of its grooves in substantially the same angular position with respect to a datum along the passline of the filament while providing an oscillatory twist in the filament upstream and downstream of the laying station. The degree of twist is dependent upon the sinuous paths of the grooves. This particular method is described in U.S. Pat. No. 4,384,446 granted May 24, 1983 and entitled "Laying of Optical Waveguides Onto a Support Filament" in the names of T. S. Hope and R. J. Williams.

The laying head 20 consists of a unitary structure metal block. The laying head is formed with a plurality of guide bores 28 for optical fibers, these bores being angularly spaced apart at substantially equal distances around the passline. As shown in FIG. 2, the bores are inclined relative to the passline with each bore having an upstream inlet end 30 and a downstream outlet end 32. The downstream end 32 lies at the surface of the axially extending passage 22 as shown particularly in FIG. 2.

The laying head also has a plurality of groove locating projections 34 which are integrally formed with the metal block laying head. The groove locating projections are associated one with each of the guide bores 28 and each projection is axially in alignment with, upstream from, but immediately adjacent to the outlet end 32 of its associated guide bore. This is shown in FIG. 2.

The laying head is also formed at its downstream end with a smooth annular outer surface which is a frustoconical surface 36. The surface 36 lies at an angle of between 40° and 50° to the passline and is associated with a means for guiding a binder tape around the support filament. This means is in the form of a fixed annulus 38 (see FIGS. 2, 3 and 5) which surrounds the feedpath for the filament and has a tapered upstream end surface 40 to a central passage 41. The tapered upstream end surface surrounds and is slightly spaced from the surface 36 to provide a guide passage for the binder tape. The tapered upstream end surface 40 extends inwards from a radial surface 42 ending in a rounded shoulder 44. A binder supply station is provided to carry the spool 17 of binder tape. The binder tape is fed from the spool and around the annulus onto the support filament as will be described.

Figure 5:
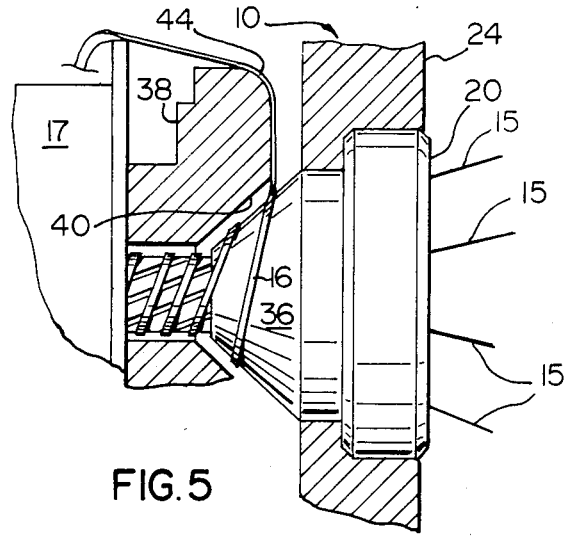
FIG. 5 is a side-elevational view, partly in cross-section, and showing the apparatus in use.

In use of the apparatus of the first embodiment, the support filament 12 is fed along the feedpath and through the laying head 20, as shown in FIGS. 3 and 5, before proceeding through the annulus 38 and the spool 17 and being wound onto the reel 18 (see FIG. 1). As the filament proceeds along its path, optical fibers 15 are laid into the grooves of the filament from optical storage spools 46 disposed upstream of the laying head. The spools are held in fixed positions as there is no need to rotate them although the sinuations in the filament move alternately around the filament axis in one direction and then in the other. Rotation of the fibers around the axis of the filament so as to lay them into the grooves is accomplished by rotational movement in alternate directions of the laying head 20. This rotational movement is accomplished by reception of the projections 34 within each of the grooves 14 of the filament 12 and, as can be seen from FIG. 4, these projections are shaped substantially complementary to the side surfaces of the grooves. As can be seen from FIGS. 3 and 4 particularly, the projections 34 are the sole part of the laying head projecting into the grooves. Nevertheless the fibers are passed along the bores 28 and are laid successfully into the grooves. This is assisted by the fact that the outlet ends 32 of the bores 28 partly open into the projections 34 themselves as shown in FIGS. 3 and 4, so that a part at least of each bore 28 projects between the walls of the grooves 14 (FIG. 4).

During the laying procedure, the projections 34 ensure that the laying head locates itself accurately with regard to the grooves 14 as the grooves move sinuously around the filament during passage through the laying head whereby each of the bores 28 is aligned correctly with its associated groove 14. As can be seen from the Figures, the axial length of the projection 34 may be sufficiently small to enable fibers to be laid into grooves having a small lay length, i.e. the distance along the length of the groove between change in direction of groove orientation. This lay length may be as small as 100 mm. In addition to this, because the projections 34 which position the laying head are immediately adjacent the outlet ends 32 of the bores 28, it has been found that a speed of operation may be accomplished, i.e. 18 meters/minute and possibly up to 30 meters/minute while ensuring that the fibers are correctly laid. This is accomplished in the head of the first embodiment with each projection 34 having an axial length varying between 3 and 5 mm and with a guide bore diameter varying between 2 and 3 mm.

The laying head structure is also advantageous in that it is of simple construction with no moving parts and is easy to manufacture. Further, because the guide bores are provided in the one piece metal block structure, then the maximum diameter of the bores is not restricted to the size of a guide tube as in prior art constructions, this size being severely limited by the requirement for the tube to enter into one of the grooves 14. It has been found that the size of the guide bores may be made much larger than has been heretofore possible and providing the projections 34 are locatable within the grooves 14, then a correctly aligned guide bore will pass the fibers accurately into the groove. The use of a larger diameter guide bore also decreases the chances of breakage of the fibers as they are being laid. In addition, fibers which have a paint covering are more easily passed through the guide bores than has been possible previously.

As a result of all of the above advantages present in the construction of the invention and in the first embodiment, the time required for setting up the apparatus is drastically reduced, there is an improvement in the yield of support filament carrying fibers in the grooves and there are fewer breakages of the fibers during the laying process. Also, the apparatus controls the positioning of the fibers so accurately that fibers are not permitted to move from their associated grooves into other grooves.

In addition to the above advantages, the guide bores may be made sufficiently large to accommodate not only optical fibers but also a pair of insulated copper conductors of 22 AWG which may be inserted into a groove instead of the fibers.

The laying head operates extremely satisfactorily with the use of the binder guide means described above. As the binder tape 16 is drawn from the spool 17 by the downstream movement of the filament, it passes around the curved shoulder 44 of the guide annulus 38 (FIGS. 3 and 5). The tape then proceeds inwardly towards and around the smooth frusto-conical surface 36 of the laying head. The drawing action of the filament ensures that wrappings of the binding tape are drawn down the smooth frusto-conical surface until these wrappings become tightly engaged upon the filament itself. As can be seen from FIG. 5, because the wrappings move tightly and inwardly towards the support filament as the optical fibers are being laid into the grooves, then the binding tape leaves the surface 36 and is wrapped around the filament 12 before the fibers issue downstream from the laying head. As a result, as the fibers move away from the laying head, the binding tape is already in position surrounding the support filament. The support filament carrying the optical fibers and bearing the binder tape is then passed around the reel 18 as shown in FIG. 1.

Thus, in a preferred form of the invention as shown by the first embodiment, the use of guide fingers or tubes which are located within the grooves of the support filament is avoided together with the problems associated with this type of laying structure. Hence, the forming into a permanently curved shape or the breaking of such fingers or tubes is avoided, such occurrences being associated with incorrect laying of fibers into the grooves and/or breakages of the fibers themselves. In addition to this, the binder tape will be drawn successfully in a lateral direction along the frusto-conical surface 36 without any tendency for the threads of the binder to separate from each other during such movement. This successful movement is easily accomplished with the frusto-conical surface 36 being at a high angle with regard to the passline of the support filament as distinct from the low angle which guide tubes necessarily assume for passing the fibers without undue bending into the grooves themselves. Such low angles may be of the order of about 8°. With a previous suggested arrangement in which the binding tape moved around the guide fingers lying at such a low angle, it was found that separation of the threads of the binder material did tend to occur thereby causing binder breakage and deterioration of the binder material.

Figure 6:
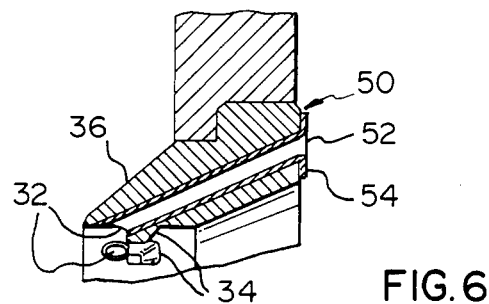
FIG. 6 is a cross-sectional view similar to FIG. 2, of part of a second embodiment.

In a second embodiment of the invention (FIG. 6) which is otherwise of similar construction to the first embodiment, apparatus for locating optical fibers into a support filament comprises a laying head 50 which is of the same construction as the laying head 20 except that instead of the bores being formed directly into the metal block, they are provided within insert tubes 52 which are located firmly in position within the block. Each of these tubes has an inclined head 54 which abuts against the upstream end surface 56 of the laying head so as to prevent the tube being drawn downwardly through the block 20 by the passage of the fibers. The inclined heads also prevent the tubes from rotating inside the metal block bores, retaining them in the precise position required. These tubes would be used only for installing optical fibers and are removed for the passage of a pair of insulated copper conductors of 22 AWG.

What is claimed is:

1. Apparatus for assembling optical fibers into sinous grooves extending along the outer surface of a support filament comprising a laying head surrounding an axially extending passage for accommodating the support filament as it moves along a passline through the passage, the laying head:
    (a) formed with a plurality of guide bores for optical fibers, said bores fixed in position within the head, and angularly spaced apart around and inclined relative to the passline with each bore having an inlet end disposed radially outwardly from an oulet end which lies at the surface of the axially extending passage and at the downstream end of the bore with respect to the direction of movement of the filament along the passline;
    (b) having a plurality of groove locating projections associated with some at least of the guide bores, one bore to each projection, the projections extending into the passage each in a position axially to one side of and immediately adjacent the outlet end of its associated guide bore; and
    (c) having a downstream end portion provided with a smooth annular outer surface which converges towards the passline in the downstream direction;
    the apparatus also comprising a means for guiding a binder around the support filament from a binder supply station downstream from the laying head, said guiding means operable to guide binder around the annular surface whereby the binder will slide along the annular surface towards the passline.

2. Apparatus according to claim 1 wherein the laying head comprises a metal block and the guide bores are formed in the block.

3. Apparatus according to claim 1 wherein the laying head comprises a metal block with insert tubes held within the block and defining the guide bores.

4. Apparatus according to claim 1 wherein each groove locating projection lies axially upstream of the outlet end of its associated guide bore.

5. Apparatus according to claim 1 wherein the annular surface is frusto-conical.

* * * * *